G. C. MARX.
ELECTRICAL DRIVING MECHANISM.
APPLICATION FILED APR. 23, 1906.

909,631.

Patented Jan. 12, 1909.

WITNESSES:
Eugene H. Duerr
Anthony Miltenberger

INVENTOR
Gustave C. Marx.
BY
Henry J. Miller
ATTORNEY

UNITED STATES PATENT OFFICE.

GUSTAVE C. MARX, OF ELIZABETH, NEW JERSEY, ASSIGNOR TO DIEHL MANUFACTURING COMPANY, A CORPORATION OF NEW JERSEY.

ELECTRICAL DRIVING MECHANISM.

No. 909,631.　　　　Specification of Letters Patent.　　　　Patented Jan. 12, 1909.

Application filed April 23, 1906. Serial No. 313,167.

*To all whom it may concern:*

Be it known that I, GUSTAVE C. MARX, a citizen of the United States, residing at Elizabeth, in the county of Union and State of New Jersey, have invented certain new and useful Improvements in Electrical Driving Mechanism, of which the following is a specification, reference being had therein to the accompanying drawings.

In the installation of driving mechanism involving a motor and a friction transmission device for operating small machines, such as sewing machines, lathes &c. involving the employment of a connecting belt, it has been customary heretofore to ship the motor and transmission devices separately and to assemble them into operative relation by securing them independently to the table or frame of the machine to be driven. In certain devices of this character, such method of installation has involved the setting up of the component members in a defective alinement, and it is the object of the present invention to insure the perfect assemblage of the parts by permanently securing them together before installation in connection with the machine to be driven.

In its preferred form the invention comprises a motor-frame provided with a foot-piece by which it may be attached to a suitable support and carrying all of the operative members of the driving device, whereby the parts may be permanently assembled together for testing in the factory where they are constructed and shipped, as thus assembled, for practical operation under the same conditions.

The invention will be understood by a reference to the annexed drawings in which—

Figure 1:
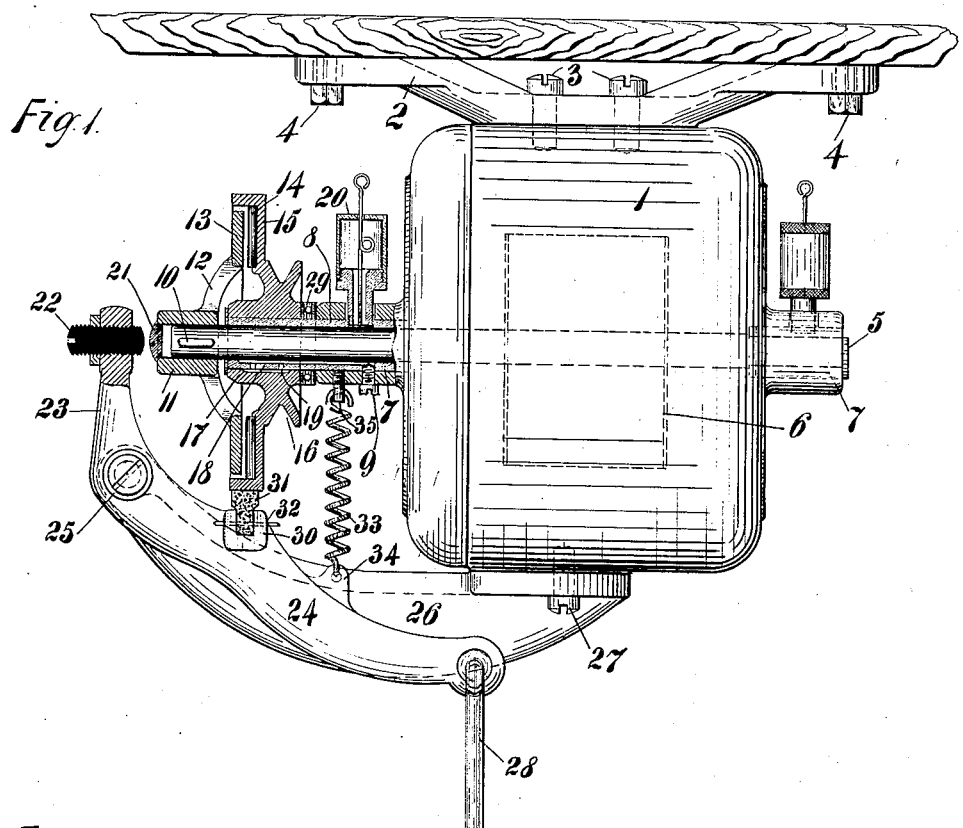
Figure 2:
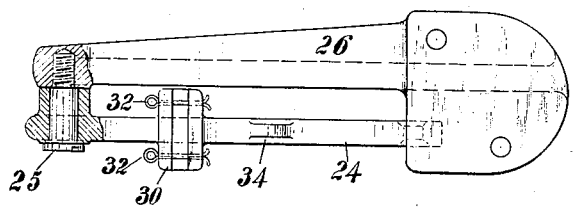

Figure 1 is an elevation, partly in section of a driving device embodying the present improvement, and Fig. 2 a plan, also partly in section, representing the auxiliary bracket member of the motor-frame and the operating lever pivotally connected therewith.

The motor-frame 1 is provided at the top with a foot-piece 2 connected therewith by screws 3, the foot-piece being represented as secured to the under side of a supporting work-table by means of lag screws 4. The shaft 5 carrying the armature 6 is mounted in bearings 7 at opposite sides of the frame 1, that at the left in Fig. 1 being provided with a long bearing sleeve 8 secured removably thereto by means of a fastening screw 9. The extreme end of the armature shaft 5 is provided with a feather or spline 10 to which is fitted the endwise-movable sleeve 11 having lateral arms 12 supporting the annular driving friction-clutch member 13 adapted for engagement with the usual yielding facing 14 of the recessed driven clutch member 15 formed upon one edge of the grooved pulley-wheel 16 having a hub 17 formed as a loose sleeve mounted to rotate freely upon the outer end of the fixed bearing sleeve 8.

The bearing sleeve is represented as having a longitudinal oil-duct 18 upon its inner face which is connected with that portion of the exterior surrounded by the loose sleeve 17 by the transverse openings 19. The oil cup 20 is shown screwed into the upper side of the bearing sleeve 8 to serve as a common reservoir for supplying lubricant both to the armature shaft 5 and the loose sleeve 17.

The outer end of the sleeve 11 is provided with a wearing button 21 adapted to be engaged by the adjacent end of a bearing-screw 22 carried by the upright arm 23 of an operating lever fulcrumed upon a screw stud 25 carried by the outer end of a supporting bracket 26 and attached by screws 27 to the lower side of the motor-frame 1, the longer laterally extending arm 24 of the operating lever having at its extreme end a treadle connection 28 by means of which it may be depressed to thrust the bearing screw 22 into operative engagement with the button 21 for forcing the driving member 13 of the clutch into operative relation with the driven member 15 to effect the rotation of the pulley wheel 16 and thereby produce the operation of the machine to be driven. In order to take the endwise thrust of the sleeve 17, an anti-friction thrust-ring 29 of well known construction is interposed between the same and the bearing member 7.

As represented herein, the operating lever is provided with a transverse notch 30 containing a block 31 of soft or yielding material such as leather, secured therein by means of split pins 32, and such block is normally maintained yieldingly in frictional contact with the cylindrical rim of the driven clutch member 15 by means of a spring 33 interposed between a perforated ear 34 upon the same and a screw stud 35 secured to the bearing hub 7 above the same.

The operation of the device is similar to that of others of the same class, the engagement of the brake-block 31 with the clutch member 15 serving to prevent the rotation of the pulley-wheel 16 until the treadle rod is depressed in opposition to the spring 33, when the brake-block 31 is withdrawn and the bearing screw 22 brought into engagement with the button 21 to force the driving clutch member into engagement with the driven clutch member so as to induce the engagement of the pulley-wheel 16. The release of the treadle rod 28 permits the spring 33 to restore the initial relation of the parts.

As in all driving devices involving the employment of an electric motor, the armature-shaft is fitted to its bearings for free endwise movement, in order that the armature may accommodate itself to the field and find the neutral point of the latter in which relation it operates most efficiently. It is therefore undesirable to fix the driving clutch member upon such shaft and force the same endwise into engagement with the driven clutch member, as this would serve to disturb to a more or less degree the efficient relation of the armature with the field magnets fixed in the frame. For the sake of compactness and convenience of control it is also desirable to apply at the end of the shaft the power required to force the clutch members into operative relation. Thus by applying the driving clutch member with the use of a spline to permit its endwise movement upon the shaft without relative rotatory motion thereon, I have been enabled to secure the desired result in the simplest possible way, all parts of the mechanism being assembled together in a single frame, so that the device may be put together once for all in the factory preparatory to testing and may thereafter be shipped without removing or otherwise disarranging any of its component parts.

The use of the removable bearing sleeve 8 is a matter of considerable importance, in that it affords an effective bearing for the loose clutch member 15 which receives the entire transverse thrust of the brake member 31 when the machine is at rest without imposing any wear whatever to the relatively movable parts, thus relieving the shaft 5 of the wear which would otherwise be imposed by said loose clutch member. Being removable, this bearing sleeve, which is subjected to the greater wear of the relatively rotating parts, may be readily renewed and the life of the wearing parts thus greatly increased at a very slight expense.

Having thus set forth the invention, what I claim herein is,—

1. An electrical driving device comprising a motor-frame, a driving shaft journaled therein, a driving element mounted upon said shaft and inclosed within the motor-frame, a driving friction-clutch member having a hub splined upon and extending beyond and inclosing the end of said shaft upon which it is endwise movable, a bearing sleeve carried by said motor-frame and affording an internal bearing for the driving shaft adjacent said clutch member and a concentric external bearing, a driven clutch member provided with a pulley-wheel and having a hub loosely fitted upon the external bearing of said sleeve, a fixed fulcrum carried by said motor-frame, and an operating lever mounted upon said fixed fulcrum and adapted to axially engage the hub of said driving friction clutch member to thrust the latter into operative engagement with the driven clutch member.

2. An electrical driving device comprising a motor-frame, a driving shaft journaled therein, a driving element mounted upon said shaft and inclosed within the motor-frame, a driving friction-clutch member having a hub splined upon and extending beyond and inclosing the end of said shaft upon which it is endwise movable, a removable bearing sleeve mounted in said motor-frame and affording an internal bearing for the driving shaft adjacent said clutch member and a concentric external bearing, a driven clutch member provided with a pulley-wheel and having a hub loosely fitted upon the external bearing of said sleeve, a fixed fulcrum carried by said motor-frame, and an operating lever mounted upon said fixed fulcrum and adapted to axially engage the hub of said driving friction clutch member to thrust the latter into operative engagement with the driven clutch member.

3. An electrical driving device comprising a motor-frame, a driving shaft journaled therein, a driving element mounted upon said shaft and inclosed within the motor-frame, a driving friction-clutch member having a hub splined upon and extending beyond and inclosing the end of said shaft upon which it is endwise movable, a removable bearing sleeve mounted in said motor-frame and affording an internal bearing for the driving shaft adjacent said clutch member and a concentric external bearing, a driven clutch member provided with a cylindrical braking portion and with a pulley-wheel and having a hub loosely fitted upon the external bearing of said sleeve, a fixed fulcrum carried by said motor-frame, a two-armed angle-lever mounted at the junction of its arms upon said fixed fulcrum and having its arms disposed in substantially the plane of said shaft and one of said arms adapted to engage the hub of the driving clutch member and to thrust the latter into operative relation with the driven clutch member, and a brake-shoe carried by the other arm of said lever and adapted to operatively engage the annular braking portion of the driven clutch member when the first-named arm is retracted.

4. An electrical driving device comprising a motor-frame, a driving shaft journaled therein, a driving element mounted upon said shaft and inclosed within the motor-frame, a driving friction-clutch member having a hub splined upon and extending beyond and inclosing the end of said shaft upon which it is endwise movable, a removable bearing sleeve mounted in said motor-frame and affording an internal bearing for the driving shaft adjacent said clutch member and a concentric external bearing, a driven clutch member provided with a cylindrical braking portion and with a pulley-wheel and having a hub loosely fitted upon the external bearing of said sleeve, a fixed fulcrum carried by said motor-frame, a two-armed angle-lever mounted at the junction of its arms upon said fixed fulcrum and having its arms disposed in substantially the plane of said shaft and one of said arms adapted to engage the hub of the driving clutch member and to thrust the latter into operative relation with the driven clutch member, and a brake-shoe of yielding material removably mounted upon and carried by the other arm of said lever and adapted to operatively engage the annular braking portion of the driven clutch member when the first-named arm is retracted.

In testimony whereof, I have signed my name to this specification, in the presence of two subscribing witnesses.

GUSTAVE C. MARX.

Witnesses:
 HENRY J. MILLER,
 H. A. KORNEMANN.